(12) United States Patent
Johns et al.

(10) Patent No.: US 7,429,057 B2
(45) Date of Patent: Sep. 30, 2008

(54) LIFTING SYSTEMS AND METHODS FOR USE WITH A HITCH MECHANISM

(75) Inventors: Timothy M. Johns, Palo Alto, CA (US); Alexey Vihracheff, Castro Valley, CA (US); Harry J. Stagg, Vallejo, CA (US); Anastacio Cruz, Jr., San Leandro, CA (US)

(73) Assignee: Fedex Corporation, Memphis, TN (US)

( * ) Notice: Subject to any disclaimer, the term of this patent is extended or adjusted under 35 U.S.C. 154(b) by 0 days.

(21) Appl. No.: 10/781,629

(22) Filed: Feb. 20, 2004

(65) Prior Publication Data

US 2005/0184484 A1  Aug. 25, 2005

(51) Int. Cl.
*B60D 1/36* (2006.01)

(52) U.S. Cl. ............... 280/477
(58) Field of Classification Search ............... 280/515, 280/277, 490.1, 477, 186, 407, 508; 172/677, 172/680; 16/112.1
See application file for complete search history.

(56) References Cited

U.S. PATENT DOCUMENTS

| | | | | |
|---|---|---|---|---|
| 2,048,310 A * | 7/1936 | Wohldorf | ............ | 280/477 |
| 2,320,168 A * | 5/1943 | Benjamin et al. | ........ | 280/479.1 |
| 2,514,614 A * | 7/1950 | Von Schlegell | ......... | 280/446.1 |
| 2,555,987 A * | 6/1951 | Nelson | ............ | 172/439 |
| 2,791,443 A * | 5/1957 | Allard | ............ | 280/477 |
| 2,904,348 A * | 9/1959 | Quastad | ............ | 280/477 |
| 3,037,794 A * | 6/1962 | Richman, Jr. | ............ | 280/449 |
| 3,450,220 A * | 6/1969 | Frandsen et al. | ........... | 180/14.1 |
| 3,565,459 A * | 2/1971 | Reid | ............ | 280/477 |
| 3,774,943 A * | 11/1973 | Schmiesing | ............ | 172/677 |
| 3,826,517 A * | 7/1974 | Hunter | ............ | 280/511 |
| 3,827,724 A * | 8/1974 | Ackley | ............ | 280/511 |
| 3,874,704 A * | 4/1975 | Williams | ............ | 280/479.1 |
| 4,377,296 A * | 3/1983 | Ulshafer, Jr. | ............ | 280/416.2 |
| 4,389,058 A * | 6/1983 | Cadwell | ............ | 280/416.2 |
| 4,482,166 A | 11/1984 | Van Antwerp | | |
| 4,542,913 A * | 9/1985 | Giesmann | ............ | 172/272 |
| 5,261,687 A * | 11/1993 | Bergman | ............ | 280/478.1 |
| 5,316,330 A * | 5/1994 | Bergeron | ............ | 280/477 |
| 5,427,399 A * | 6/1995 | Olson | ............ | 280/515 |
| 5,772,230 A * | 6/1998 | Kemnitz | ............ | 280/491.3 |
| 2003/0085047 A1 | 5/2003 | Ollefs | | |

FOREIGN PATENT DOCUMENTS

DE  20108736 U1  8/2001
JP  04019205  1/1992

OTHER PUBLICATIONS

International Search Report dated May 18, 2005.

* cited by examiner

*Primary Examiner*—Lesley D. Morris
*Assistant Examiner*—Daniel Yeagley
(74) *Attorney, Agent, or Firm*—Finnegan, Henderson, Farabow, Garrett & Dunner, L.L.P.

(57) ABSTRACT

A lifting system for a hitch mechanism is provided. The lifting system includes a raise/lower member; an intermediate mechanism to move the raise/lower member between a lower position and an upper position; and a control for causing the intermediate mechanism to move the raise/lower member from one position to the other.

18 Claims, 11 Drawing Sheets

LIFTING SYSTEMS AND METHODS FOR USE WITH A HITCH MECHANISM

The present invention is directed to a lifting system for a hitch mechanism of a vehicle and, in particular, a lifting system capable of raising and lowering a tongue of a structure such as a dolly before the dolly is hitched to the vehicle. The system, apparatus, and methods of the present invention allow the dolly to be hitched to the vehicle without having a person physically present between the vehicle and the dolly. As explained below, in one embodiment, both the lifting system and the hitch mechanism can be positioned and operated by the operator, while the operator is on the vehicle.

Presently, to hitch a dolly to a vehicle, such as a cargo vehicle used at airports, a person must stand between the dolly and the vehicle to manually move the dolly tongue in order to insert a hitch pin of the hitch mechanism into an opening of the dolly tongue, at the same time as a driver of the vehicle drives the vehicle towards the dolly. This, at times, resulted in the person standing between the dolly and the vehicle to be struck by the vehicle, including being run over by the vehicle. The present invention eliminates the need for a person to stand in harm's way between the dolly and the vehicle.

One embodiment of the present invention is directed to a lifting system for use with a hitch mechanism. The lifting system includes a raise/lower member, an intermediate mechanism to move the raise/lower member between a lower position and an upper position, and a control for causing the intermediate mechanism to move the raise/lower member from one position to the other.

The raise/lower member may be capable of engaging and supporting a structure that is capable of being coupled with the hitch mechanism. The raise/lower member may include at least a portion that is capable of being slid under the structure to support the structure. In one embodiment, the raise/lower member is attached with the hitch mechanism.

In one embodiment, the control includes at least a handle member that may be attached with the intermediate mechanism. The handle member is provided with an opening. The intermediate mechanism includes at least a link member and a first attachment mechanism. The link member includes a pair of linkage bars. Each of the pair of linkage bars is provided with a first opening proximal to an upper end thereof. The first attachment mechanism includes at least a first bolt and a first nut. The link member is attached with the handle member by inserting the first bolt through the first opening of each of the pair of linkage bars and the opening of the handle member, and then securing the first bolt with the first nut.

In one embodiment, the raise/lower member is attached with the intermediate mechanism. The raise/lower member includes a plurality of leg portions, a horizontal member that has a first end attached with a first leg portion and a second end attached with a second leg portion, and a first lever member attached with the horizontal member. The first lever member is provided with an opening. The intermediate mechanism includes at least a link member and a second attachment mechanism. The link member includes a pair of linkage bars. Each of the pair of linkage bars is provided with a second opening proximal to a lower end thereof. The second attachment mechanism includes at least a second bolt and a second nut. The link member is attached with the raise/lower member by inserting the second bolt through the second opening of each of the pair of linkage bars and the opening of the first lever member, and then securing the second bolt with the second nut.

In one embodiment, the control is attached with the intermediate mechanism and the raise/lower member is attached with the intermediate mechanism. In one embodiment, movement of the handle member moves the intermediate mechanism to move the raise/lower member.

In one embodiment, the hitch mechanism is capable of coupling a structure to a vehicle. In one embodiment, movement of the handle member in a direction outward from the vehicle moves the intermediate mechanism in a downward direction to lower the raise/lower member. In another embodiment, movement of the handle member in a direction inward toward the vehicle moves the intermediate mechanism in an upward direction to raise the raise/lower member.

In one embodiment, the lifting system further includes a biasing member. The biasing member may comprise a spring. In one embodiment, the raise/lower member includes a plurality of leg portions, a horizontal member that has a first end attached with a first leg portion and a second end attached with a second leg portion, and a second lever member attached with the horizontal member. The second lever member is provided with an opening. An end of the spring is inserted through the opening of the second lever member to attach the spring with the raise/lower member. The spring may be attached with the raise/lower member to provide a biasing force of pulling the raise/lower member in an upward direction.

Another embodiment of the present invention is directed to a hitch mechanism that includes a lifting system. The hitch mechanism includes a first handle member, a coupling member, and a first linkage mechanism for linking the first handle member and the coupling member. The first handle member is capable of being moved in order to raise and lower the coupling member. The lifting system includes a second handle member, a raise/lower member, and a second linkage mechanism for linking the second handle member and the raise/lower member. The second handle member is capable of being moved in order to raise and lower the raise/lower member.

Another embodiment of the present invention is directed to a method of hitching a structure to a vehicle. The structure includes a tongue for engagement with a hitch mechanism attached with the vehicle. The method includes positioning a member of a lifting system, which is attached with at least one of the hitch mechanism and the vehicle, in a lower position. The member is capable of engaging and supporting the structure tongue. The method further includes causing the member to engage and support the structure tongue, raising the member to an upper position so that the structure tongue is capable of aligning with the hitch mechanism, and placing the hitch mechanism into coupled engagement with the structure tongue.

In one embodiment, the member is a raise/lower member for engaging and supporting the structure tongue, and the lifting system further includes a control device for operating the raise/lower member and an intermediate mechanism for lowering and raising the raise/lower member in response to the position of the control device.

In one embodiment, causing the member to engage and support the structure tongue includes moving the vehicle towards the structure until the raise/lower member is positioned underneath the structure tongue.

In another embodiment, the method further includes operating the vehicle to move the structure tongue into engagement with the hitch mechanism before placing the hitch mechanism into coupled engagement with the structure tongue. In one embodiment, operating the vehicle to move the structure tongue into engagement with the hitch mechanism includes moving the vehicle towards the structure until a coupling member of the hitch mechanism is proximal to an opening provided in the structure tongue. In one embodiment, placing the hitch mechanism into coupled engagement with the structure tongue includes moving the structure tongue into engagement with the coupling member while the coupling member is in the unhitched position, and placing the coupling member into the hitched position, thereby hitching the structure to the vehicle.

Another embodiment of the present invention is directed to a method of hitching a dolly to a vehicle. The dolly includes a tongue that is provided with an opening for engagement with a coupling member of a hitch mechanism attached with the vehicle. The hitch mechanism includes a first handle member, the coupling member, and a first linkage mechanism for linking the first handle member and the coupling member. The first handle member is capable of being moved in order to raise and lower the coupling member. A lifting system that is attached with the hitch mechanism is provided. The lifting system includes a second handle member, a raise/lower member, and a second linkage mechanism for linking the second handle member and the raise/lower member. The second handle member is capable of being moved in order to raise and lower the raise/lower member.

The method includes positioning the raise/lower member underneath the dolly tongue; raising the raise/lower member, thereby also raising the dolly tongue; positioning the coupling member proximal to the dolly tongue so that the coupling member is capable of engaging the opening of the dolly tongue; and inserting the coupling member into the opening of the dolly tongue.

In one embodiment, the method further includes lowering the raise/lower member before positioning the raise/lower member underneath the dolly tongue. Lowering the raise/lower member may include moving the second handle member to move the second linkage mechanism in a downward direction to move the raise/lower member in the downward direction.

In one embodiment, positioning the raise/lower member underneath the dolly tongue includes moving the vehicle towards the dolly until the raise/lower member is positioned underneath the dolly tongue. In another embodiment, raising the raise/lower member, thereby also raising the dolly tongue, includes moving the second handle member to move the second linkage mechanism in an upward direction to move the raise/lower member in the upward direction. In yet another embodiment, positioning the coupling member proximal to the dolly tongue so that the coupling member is capable of engaging the opening of the dolly tongue includes moving the vehicle towards the dolly until the coupling member is proximal to the opening of the dolly tongue. In another embodiment, inserting the coupling member into the opening of the dolly tongue includes moving the first handle member to move the first linkage mechanism in a downward direction to move the coupling member in the downward direction into the opening of the dolly tongue.

Another embodiment of the present invention is directed to a method of unhitching a dolly from a vehicle. The dolly includes a tongue that is provided with an opening for engagement with a coupling member of a hitch mechanism attached with the vehicle. A raise/lower member attached with the hitch mechanism is provided. When the dolly is hitched to the vehicle, the coupling member is positioned within the opening of the dolly tongue and the raise/lower member is positioned underneath the dolly tongue.

The method includes raising the coupling member so that it exits from the opening of the dolly tongue; moving the vehicle so that the dolly tongue is positioned away from the hitch mechanism, wherein the raise/lower member remains positioned underneath the dolly tongue; lowering the raise/lower member, thereby also lowering the dolly tongue; and moving the vehicle so that the raise/lower member is no longer positioned underneath the dolly tongue.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIGS. 7-11 are successive perspective views of a structure such as a dolly being hitched to a vehicle, and include the following:

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
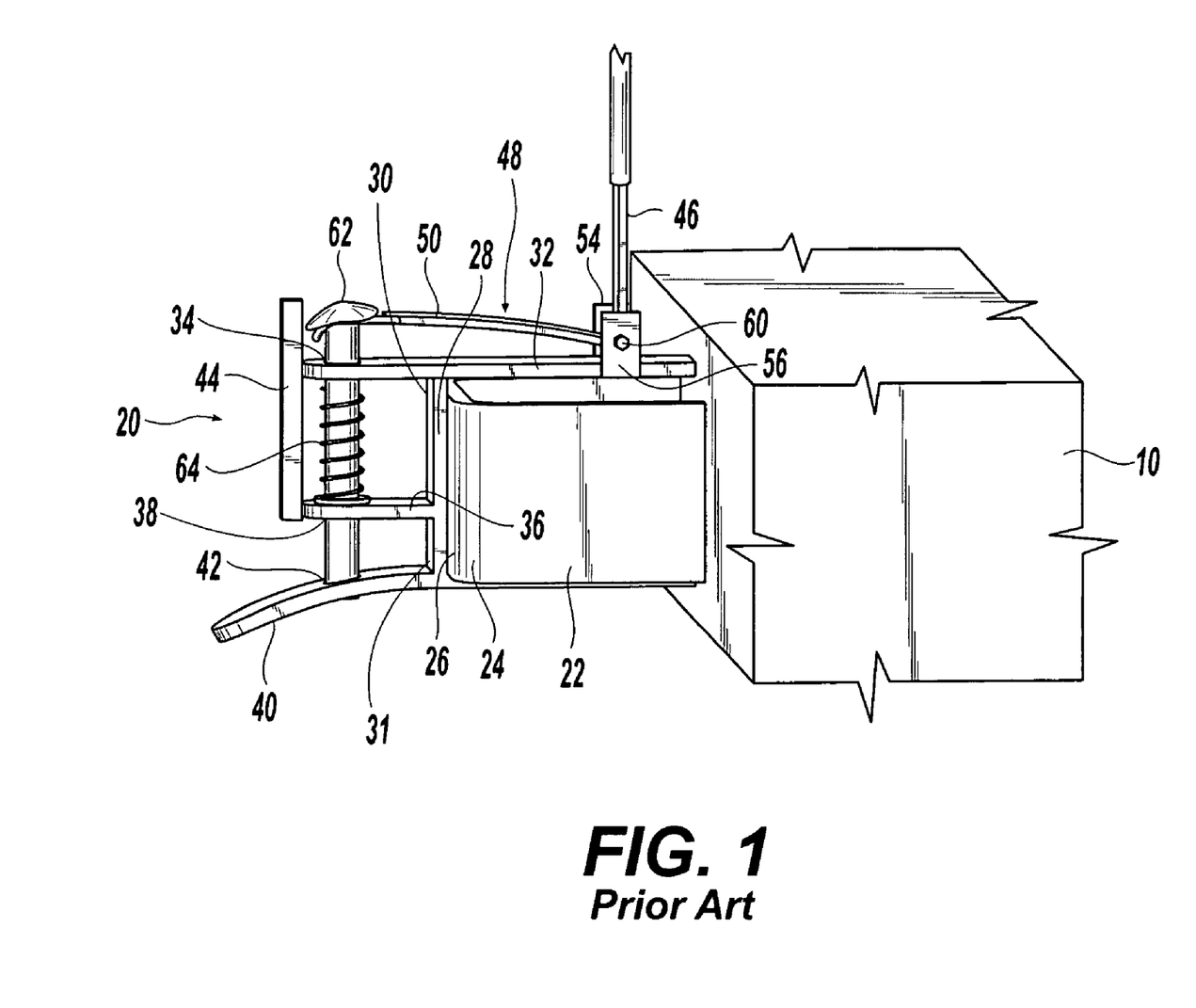
FIG. 1 is a left perspective view of a hitch mechanism attached to a vehicle.

The present invention is directed to a lifting system 70 that is capable of being used to aid in the hitching of a structure such as a dolly 140 to a vehicle 10, such as a cargo vehicle. To hitch the dolly 140 to the vehicle 10, a hitch mechanism 20 is attached to the vehicle 10, as shown in FIG. 1.

As is known in the art, a number of different hitch mechanisms can be used to hitch or couple a dolly to a vehicle. In that regard, for the purposes of this application, the term dolly is meant to include wagons, carriers, truck beds, or similar movable devices that are used to hold and transport a load of material or articles and may be pushed or pulled by a vehicle or similar moving device. Hitch mechanisms within the scope of the invention can be any one of a number of hitch mechanisms. By means of example only, a hitch mechanism might be a simple mechanical device that, for example, includes a pin that slides into openings in the hitch mechanism and the tongue of a dolly. On the other hand, the hitch mechanism could be a more complex mechanical, electromechanical, pneumatic, or hydraulic system to engage and hold onto a portion of a dolly, such as a dolly tongue. Examples of hitch mechanisms include, but are not limited to, a pimtil hitch, a ball hitch, and an E hitch.

Referring to FIGS. 1-4, one example of a hitch mechanism within the scope of the present invention, in particular, an E hitch, is shown. The hitch mechanism 20 may include a mounting mechanism 22, a first handle member 46, a first linkage mechanism 48, a coupling member 62, and a first biasing member 64. The mounting mechanism 22 may include a mount 24. Generally, the mount 24 is provided as a base on which to mount all the other components of the hitch mechanism 20 and the lifting system 70 thereto. While, in one embodiment, the mount 24 is U-shaped, it should be appreciated that the mount 24 may comprise a wide variety of shapes and sizes. The mount 24 may be attached with the vehicle 10 by a wide variety of ways, including, for example, welding the mount 24 to the vehicle 10 or by using at least one bolt or screw secured by at least one nut to attach the mount 24 with the vehicle 10. The mount 24 includes an outer surface 26.

The mounting mechanism 22 may also include a first vertical bar 28 that is attached with the outer surface 26 of the mount 24. The first vertical bar 28 may be attached with the mount 24 by a wide variety of ways, including, for example, by welding or by using at least one bolt or screw secured by at least one nut. The first vertical bar 28 includes a top end 30 and a bottom end 31.

The mounting mechanism 22 may further include a horizontal bar 32. The horizontal bar 32 may be attached with the top end 30 of the first vertical bar 28. The horizontal bar 32 may be attached with the first vertical bar 28 by a wide variety of ways, including, for example, by welding or by using at least one bolt or screw secured by at least one nut. The horizontal bar 32 may also be attached with a component of the first linkage mechanism 48, such as secondary mounts 54, 56, which are discussed below, such as by welding, or by using at least one bolt or screw secured by at least one nut. The horizontal bar 32 is provided with an opening 34 proximal to one end thereof through which the coupling member 62 is capable of being inserted, as well as being raised and lowered.

The mounting mechanism 22 may also include an extension member 36 that extends from and is attached with the first vertical bar 28. As shown, the member 36 extends from a middle portion of the first vertical bar 28. The member 36 may be attached to the first vertical bar 28 by a wide variety of ways including, for example, by welding or by using at least one bolt or screw secured by at least one nut. While, in one embodiment, the member 36 is generally half-circular in shape, it should be appreciated that the member 36 may comprise a wide variety of shapes and sizes. The member 36 is provided with an opening 38 through which the coupling member 62 is capable of being inserted, as well as being raised and lowered.

The mounting mechanism 22 may also include a hitch 40. The hitch 40 is attached with the lower end 31 of the first vertical bar 28 and/or the outer surface 26 of the mount 24. The hitch 40 may be attached with the first vertical bar 28 and/or the mount 24 by a wide variety of ways, including, for example, by welding or by using at least one bolt or screw secured by at least one nut. While, in one embodiment, the hitch 40 is generally tongue-shaped, it should be appreciated that the hitch 40 may comprise a wide variety of shapes and sizes. The hitch 40 is provided with an opening 42 through which the coupling member 62 is capable of being inserted, as well as being raised and lowered.

Figure 2:
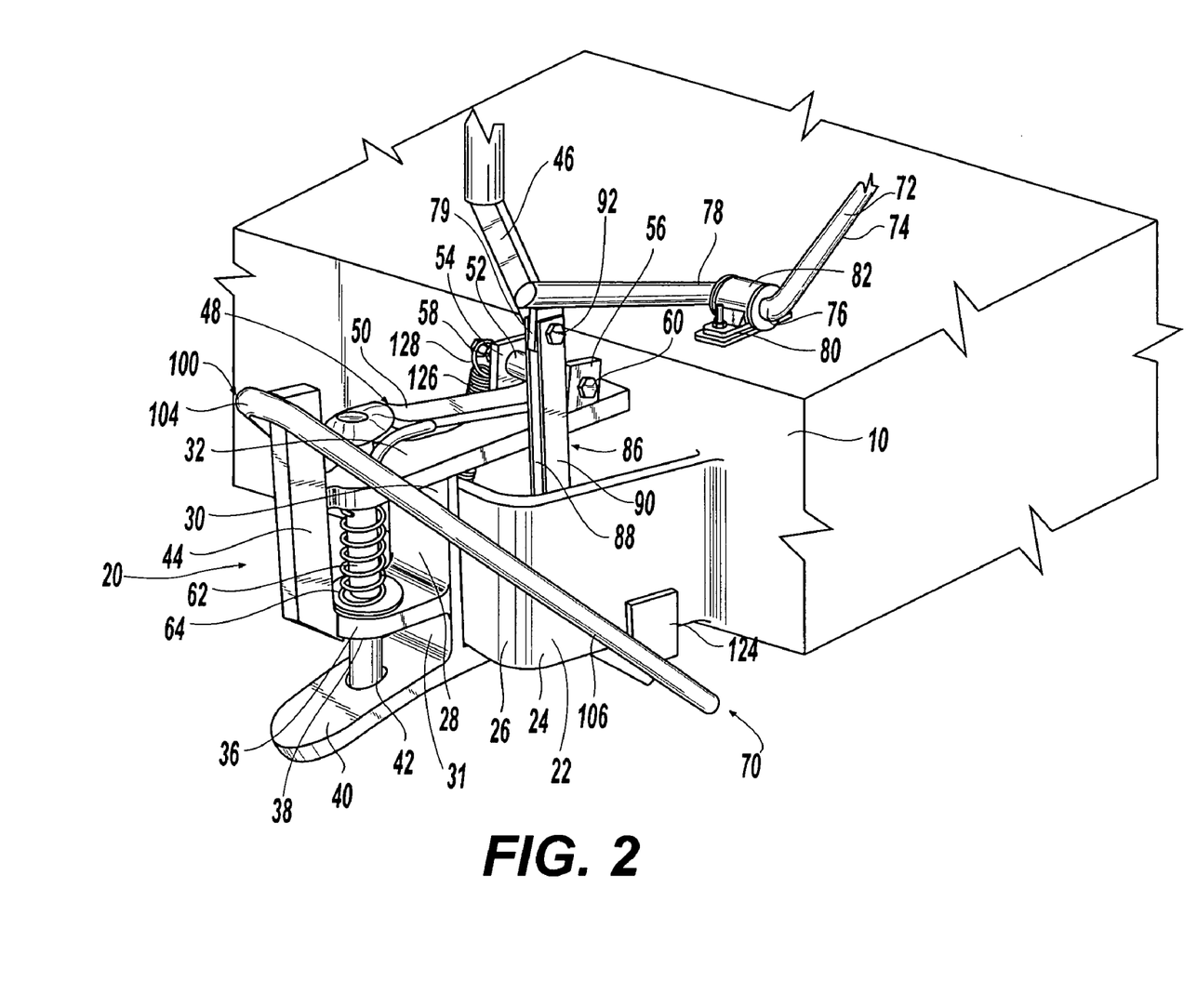
FIG. 2 is a left perspective view of a lifting system of the present invention, as well as a hitch mechanism, both attached with a vehicle, illustrating a raise/lower member of the lifting system in an upper position.

The mounting mechanism 22 may also include a second vertical bar 44. As shown, the second vertical bar 44 is attached with the horizontal bar 32 and the member 36. The second vertical bar 44 may be attached with the horizontal bar 32 and/or the member 36 by a wide variety of ways, including, for example, by welding or by using at least one bolt or screw secured by at least one nut. As shown in FIG. 2, a raise/lower member 100 of the lifting system 70 is capable of resting against the second vertical bar 44 when the raise/lower member 100 is in its uppermost position.

Referring to FIGS. 1-4, and as stated above, the hitch mechanism 20 may also include the first handle member 46. While, in one embodiment, at least a portion of the first handle member 46 has a thin rectangular shape, it should be appreciated that the first handle member 46 may comprise a wide variety of shapes and sizes. For example, as shown most clearly in FIG. 1, the first handle member 46 may also include a circular portion provided above the thin rectangular portion.

Referring to FIGS. 1-4, and as also stated above, the hitch mechanism 20 may also include the first linkage mechanism 48. The first linkage mechanism 48 may be provided to link the first handle member 46 and the coupling member 62 so that the first handle member 46 may be moved in order to raise and lower the coupling member 62, as discussed in more detail below.

The first linkage mechanism 48 may include a connecting bar 50 for connecting the first handle member 46 and the coupling member 62. While, in one embodiment, the connecting bar 50 has a thin rectangular shape, it should be appreciated that the connecting bar 50 may comprise a wide variety of shapes and sizes. The connecting bar 50 may be attached with the first handle member 46 through a round bar 52. The round bar 52 may be attached with the first handle member 46. The connecting bar 50 may be attached with the round bar 52 and the round bar 52 may be attached with the first handle member 46, by a wide variety of ways, including, for example, by welding or by using at least one bolt or screw secured by at least one nut.

In addition, the round bar 52 is capable of rotating. In one embodiment, the round bar 52 is attached with the mount 24 through secondary mounts 54, 56, with the use of nuts and bolts 58, 60. In this manner, the round bar 52 is capable of acting like a hinge of a door.

As stated above, the hitch mechanism 20 may also include the coupling member 62. In one embodiment, the coupling member 62 is a hitch pin. The coupling member 62 may be attached with the connecting bar 50, such as by welding or by the use of at least one bolt or screw secured by at least one nut.

As also stated above, the hitch mechanism 20 may also include the first biasing member 64. In one embodiment, the first biasing member 64 is a spring.

The coupling member 62 is capable of being moved in the upward and downward directions in the following manner. In particular, in one embodiment, the first handle member 46 is capable of being moved inward toward the vehicle 10 and outward away from the vehicle 10. When the first handle member 46 is moved inward or outward, the round bar 52 rotates in a clockwise or counterclockwise rotation, respectively (if viewing the round bar 52 from the right back end of the vehicle 10). Because the round bar 52 is attached with the connecting bar 50, any clockwise or counterclockwise rotation of the round bar 52 in turn moves the connecting bar 50 upward or downward, respectively. And in turn, because the connecting bar 50 is attached with the coupling member 62, any upward or downward movement of the connecting bar 50 moves the coupling member 62 in the upward or downward direction, respectively.

Before a tongue 142 of a dolly 140 (see FIGS. 7-11) may be attached to a hitch mechanism 20 of a vehicle 10, it is picked up and aligned with the hitch mechanism 20. Under the present invention, the lifting mechanism 70 may be attached either to the vehicle 10 directly, or to the hitch mechanism 20, to first engage and support the dolly tongue 142. In the most general terms, the lifting system 70 may include a raise/lower member 100, an intermediate mechanism 86 to move the raise/lower member 100 between a lower position and an upper position, and a control 72 for causing the intermediate mechanism 86 to move the raise/lower member 100 from one position to the other. As explained more fully below, the raise/lower member 100 of the lifting mechanism 70 may be slid under the tongue 142 to support the tongue 142, and may then be raised to raise the tongue 142 and align it with the coupling member 62 that couples the tongue 142 with the hitch mechanism 20.

A variety of alternative lifting systems are within the scope of the invention. It will be apparent that a variety of different types of raise/lower members can be used to slide under and support the dolly tongue 142. Examples include both multiple-piece and unitary raise/lower members having any shape and form that allows the raise/lower member to engage and support the dolly tongue, or some other structure of a dolly that is to be attached to a hitch mechanism. For example, a cast metal raise/lower member could be used instead of the particular embodiment illustrated in the drawings, as could a molded plastic component. A wide variety of raise/lower members fall within the scope of the invention, as would be understood by persons skilled in the art, in view of the teachings and disclosures herein.

It is further apparent that a variety of different mechanical or electromechanical systems may be used to raise and lower the raise/lower member. Thus, the intermediate mechanism 86 that moves the raise/lower member 100 between the upper and lower positions may be a mechanical, electromechanical, pneumatic, or hydraulic device that is operated by an operator while on the vehicle. For example, the intermediate mechanism 86 may comprise a mechanical linkage, as discussed below.

It should also be appreciated that the control 72 that causes the intermediate mechanism 86 to move the raise/lower member 100 from one position to the other may also be a mechanical, electromechanical, pneumatic, or hydraulic device that is operated by an operator while on a vehicle.

Purely as an example, one embodiment of a lifting system 70 will be disclosed. In the embodiment shown in FIGS. 2-6, the lifting system 70 may include a control or second handle member 72, an intermediate or second linkage mechanism 86, a raise/lower member 100, and a second biasing member 126.

The second handle member 72 may include a plurality of portions, such as three portions 74, 76, and 78. The three portions 74, 76, 78 may comprise three separate pieces that are attached to each other, such as by welding or by the use of bolts or screws secured by nuts, or may comprise a single piece that is bent twice to provide the three portions. While, in one embodiment, the three portions 74, 76, 78 of the second handle member 72 are circular in shape, it should be appreciated that the portions 74, 76, 78, as well as the second handle member 72 itself, may comprise a wide variety of shapes and sizes.

The second handle member 72 may be attached to the vehicle 10. In one embodiment, an attachment mechanism 80 is provided to attach the second handle member 72 with the vehicle 10 in a rotatable manner. In one embodiment, the attachment mechanism 80 includes a bearing 82 to allow the second handle member 72 to rotate relative to the vehicle 10. The bearing 82 may be positioned around only a single portion of the second handle member 72, such as portion 76.

The second handle number 72 may include an opening 84 (see FIG. 5) that is provided to attach the second handle member 72 with the second linkage mechanism 86. In one embodiment, the third portion 78 of the second handle member 72 includes a downwardly extending portion 79 that includes the opening 84. As shown, the downwardly extending portion 79 may comprise a thin rectangular shape. It should be appreciated, however, that the downwardly extending portion 79 may comprise any shape or size that is capable of attaching with the second linkage mechanism 86. Attachment of the second handle member 72 and the second linkage mechanism 86 is discussed below.

As stated above, the lifting system 70 may also include the second linkage mechanism 86. The second linkage mechanism 86 may be provided to link the second handle member 72 with the raise/lower member 100. In one embodiment, the second linkage mechanism 86 comprises a link member; a first attachment mechanism for attaching the link member with the second handle member 72; and a second attachment mechanism for attaching the link member with the raise/lower member 100.

Generally, the link member may comprise any shape and may be made of any material that is capable of linking the second handle member 72 with the raise/lower member 100. Referring to FIGS. 2-6 and, in particular, to FIG. 5, in one embodiment, the link member is comprised of two linkage bars 88, 90. While, as shown, the bars are thin and rectangular in shape, it should be appreciated that the bars may comprise a wide variety of shapes and sizes, including round or hexagonal. In addition, the link member may include a threaded portion at one or more ends that are complementary to the first and second attachment mechanisms. In the alternative, the link member may include a clevis at one or more ends that are complementary to the first and second attachment mechanisms.

The linkage bars 88, 90 each may have a first opening 88*a*, 90*a*, respectively, proximal to an upper end thereof, as well as a second opening 88*b*, 90*b*, respectively, proximal to a lower end thereof. Openings 88*a*, 90*a*, as well as openings 88*b*, 90*b*, each may have a size and shape capable of receiving a portion of the first and second attachment mechanisms, respectively, such as a bolt.

In one embodiment, the first attachment mechanism is comprised of a first bolt 92 and a first nut 94. To attach the link member 88, 90 and the second handle member 72, the bolt 92 may be inserted through opening 90*a* of bar 90, then through opening 84 of the second handle member 72 (such as downwardly extending portion 79 of third portion 78), and then through opening 88*a* of bar 88, and then secured by nut 94. It should be appreciated that, in the alternative, a bolt may be inserted through opening 88*a*, then opening 84, then opening 90*a*, and then secured by a nut. It should also be appreciated that, in addition to a bolt and a nut, the first attachment mechanism may be comprised of any other art recognized-member, such as a clevis, an aircraft ball joint, a rod end, a ball socket, or a steel eyelet.

In one embodiment, the second attachment mechanism is comprised of a second bolt 96 and a second nut 98. It should also be appreciated that, in addition to a bolt and a nut, the second attachment mechanism may be comprised of any other art recognized-member, such as a clevis, an aircraft ball joint, a rod end, a ball socket, or a steel eyelet. Attachment of the link member 88, 90 and the raise/lower member 100 is discussed below.

Figure 4:
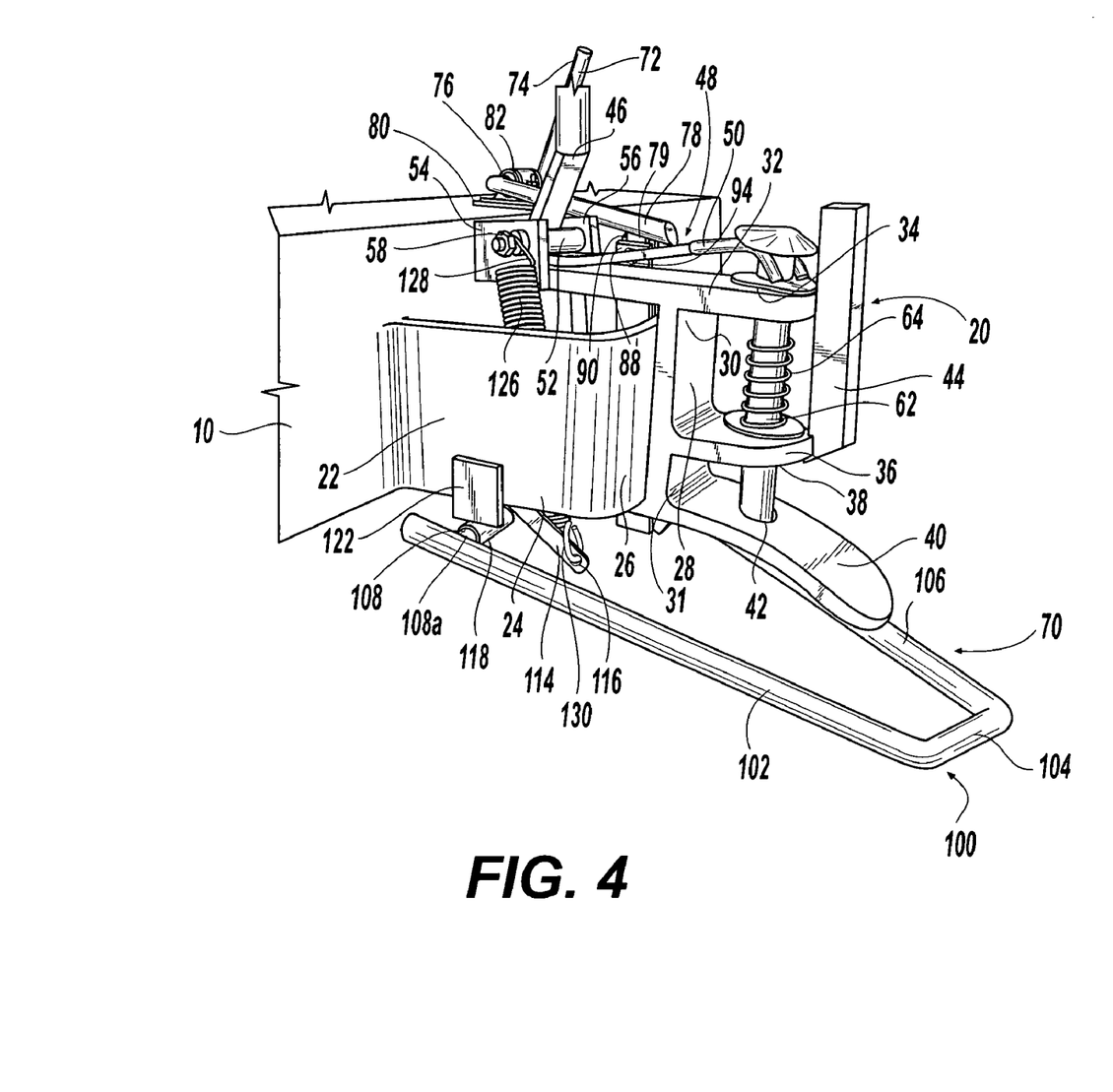
FIG. 4 is a right perspective view of the lifting system and hitch mechanism of FIG. 3.
Figure 5:
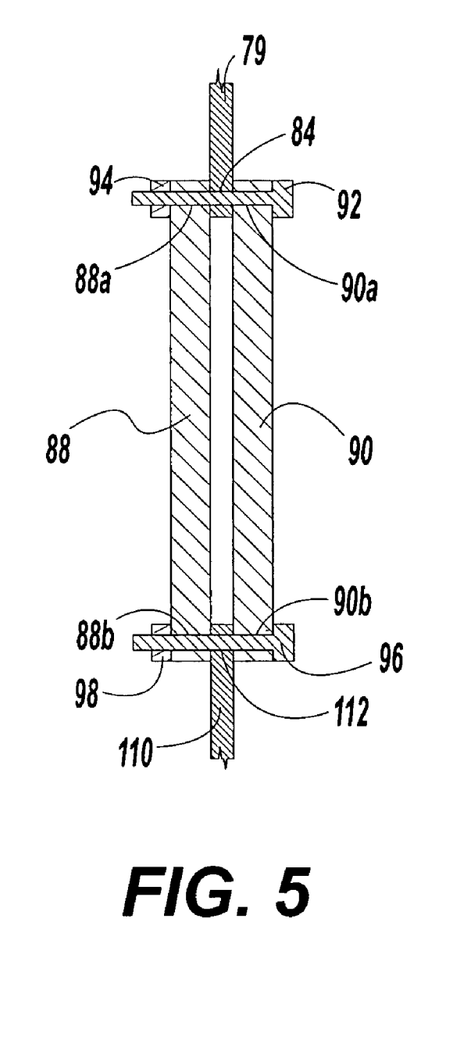
FIG. 5 is a cross-sectional front view of an intermediate mechanism of the lifting system shown in FIGS. 2-4.
Figure 6:
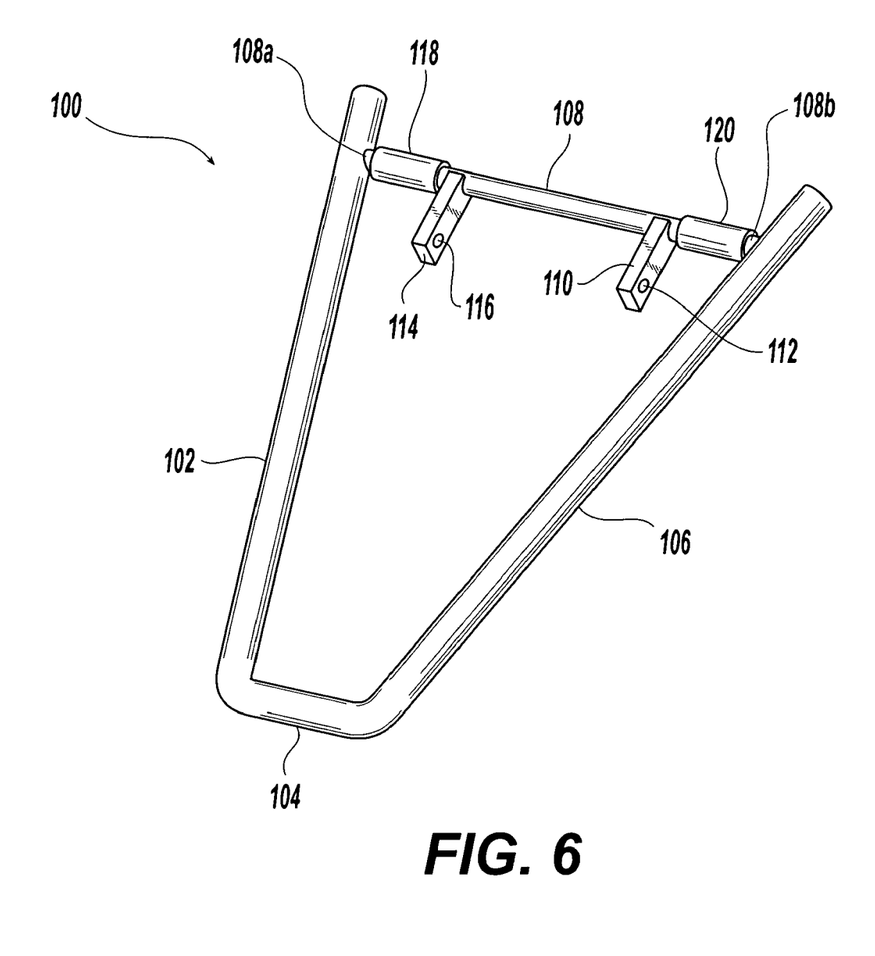
FIG. 6 is a top plan view of the raise/lower member.

Referring to FIGS. 2-6 and, in particular, to FIG. 6, and as stated above, the lifting system 70 may also include the raise/lower member 100. The raise/lower member 100 may include a plurality of leg portions, such as three leg portions 102, 104, and 106. The three leg portions 102, 104, 106 may comprise three separate pieces that are attached with each other, such as by welding or by the use of bolts or screws secured by nuts, or may comprise a single piece that is bent twice to provide the three leg portions. While, in one embodiment, the three leg portions 102, 104, 106 of the raise/lower member 1 00 have a shape that is circular in cross-section, it should be appreciated that these leg portions 102, 104, 106 may comprise a wide variety of shapes and sizes.

As shown, the leg portions 102, 104, 106 of the raise/lower member 100 are attached with each other so that the raise/lower member 100 generally has a U-shape. It should be appreciated, however, that the raise/lower member 100 may comprise other shapes, such as square (i.e., with a fourth leg portion), round, V-shape, or L-shape. Basically, the raise/lower member 100 may comprise any shape that allows it to be positioned underneath the dolly tongue 142 to engage and support the dolly tongue 142, and then to raise the dolly tongue 142.

The raise/lower member 100 may also include a horizontal member 108 that has a first end 108a attached with a first leg portion 102 and a second end 108b attached with a second leg portion 106. The horizontal member 108 may be attached with the leg portions 102, 106 by a wide variety of ways, including, for example, by welding or by using at least one bolt or screw secured by at least one nut.

The raise/lower member 100 may also include a first lever member 110 and a second lever member 114 both attached with the horizontal member 108. The lever members 110, 114 may be attached with the horizontal member 108, by a wide variety of ways, including, for example, by welding or by using at least one bolt or screw secured by at least one nut. Each lever member 110, 114 is provided with an opening 112, 116, respectively. The opening 112 is provided to attach the second linkage mechanism 86 with the raise/lower member 100, as discussed below. The opening 116 is provided to attach the raise/lower member 100 with the second biasing member 126, as also discussed below.

Figure 3:
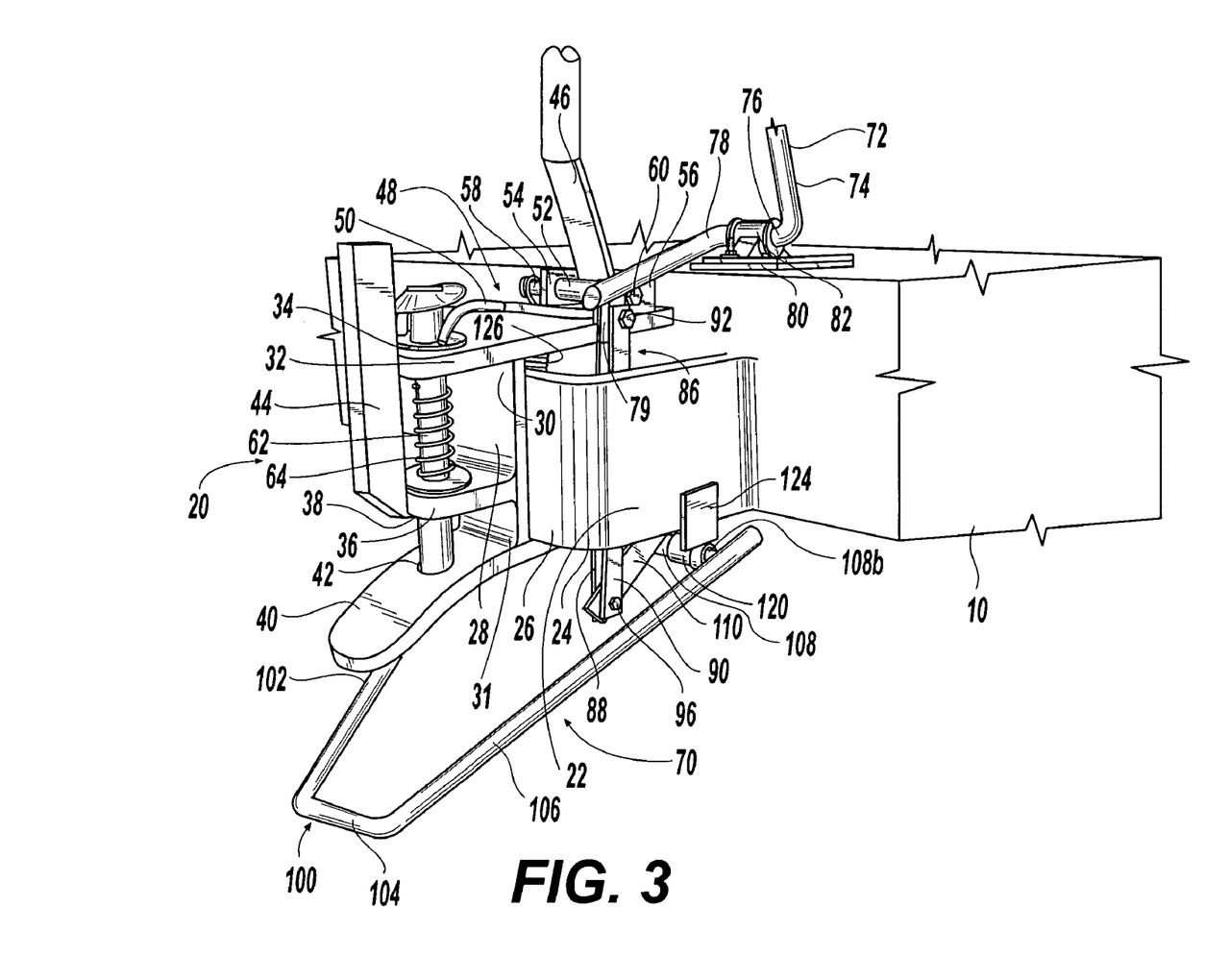
FIG. 3 is a left perspective view of the lifting system and hitch mechanism of FIG. 2, illustrating the raise/lower member of the lifting system in a lower position.

Referring to FIGS. 2-6 and, in particular, to FIG. 5, and as stated above, in one embodiment, the second attachment mechanism of the second linkage mechanism 86 is comprised of a bolt 96 and a nut 98. To attach the second linkage mechanism 86 (in particular, the link member 88, 90) with the raise/lower member 100, the bolt 96 may be inserted through opening 90b of bar 90, then through opening 112 of the lever member 110, and then through opening 88b of bar 88, and then secured by nut 98. It should be appreciated that, in the alternative, a bolt may be inserted through opening 88b, then opening 112, then opening 90b, and then secured by a nut.

Referring to FIGS. 2-4 and 6, to attach the raise/lower member 100 with the mounting mechanism 22 of the hitch mechanism 20 so that the raise/lower member 100 is capable of rotating, the raise/lower member 100 may include a pair of hollow members 118, 120 and the mounting mechanism 22 may include a pair of welding members 122, 124. In particular, as shown, hollow member 118 is attached with welding member 122, while hollow member 120 is attached with welding member 124. The hollow members 118, 120 may each comprise a hollow pipe. However, it should be appreciated that hollow members 118, 120 may comprise a wide variety of shapes and sizes that allow for the horizontal member 108 to rotate within the hollow members 118, 120. In one embodiment, the hollow member 118 is provided around the horizontal member 108 between the first leg portion 102 and the lever member 114, while the hollow member 120 is provided around the horizontal member 108 between the second leg portion 106 and the lever member 110.

In one embodiment, the welding members 122, 124 are attached with the mount 24 of the mounting mechanism 22, such as by welding or by the use of at least one bolt or screws secured by at least one nut. The welding members 122, 124 may comprise a square shape, as viewed from the left or right side of the vehicle 10. The welding members 122, 124 may also comprise an L-shaped cross-section, as viewed from the rear of the vehicle 10. If the welding members 122, 124 have an L-shaped cross-section, then it is at least a portion of that L-shape that is attached with the hollow members 118, 120, such as by welding. It should be appreciated that while the members 122, 124 are designated as "welding" members, each hollow member 118, 120 may be attached with a respective member 122, 124 by other attachment means, such as by using at least one bolt or screw secured by at least one nut.

The hollow members 118, 120 are attached with the mounting mechanism 22 so that the hollow members 118, 120 do not rotate relative to the mounting mechanism 22 and/or mount 24. However, because the hollow members 118, 120 are hollow and are provided around the horizontal member 108, the horizontal member 108 is capable of rotating within the hollow members 118, 120. Because the horizontal member 108 is a component of the raise/lower member 100, the use of the hollow members 118, 120 allows the entire raise/lower member 100 to be capable of rotating or otherwise changing location, such as from an upper position (see FIG. 2) to a lower position (see FIGS. 3 and 4).

The hollow members 118, 120 may be provided around the horizontal member 108 in a variety of manners. In one embodiment, before the horizontal member 108 is attached with leg portions 102, 106, the hollow members 118, 120 are placed around the horizontal member 108. Once the horizontal member 108 is attached with the leg portions 102, 106, the hollow members 118, 120 cannot be removed from around the horizontal member 108.

As stated above, the lifting system 70 may also include the second biasing member 126. In one embodiment, the second biasing member 126 is a spring having a first end 128 and a second end 130. As shown most clearly in FIG. 4, in one embodiment, the first end 128 may be attached with the mounting mechanism 22 by attaching the first end 128 with the nut 58 or bolt 60 for the round bar 52 of the first linkage mechanism 48. However, it should be appreciated that the first end 128 may be attached with the mounting mechanism 22 at a variety of places and may in the alternative be attached with the vehicle 10 itself.

The second end 130 of the second biasing member 126 may be attached with the raise/lower member 100. As shown most clearly in FIG. 4, the second end 130 is attached with the raise/lower member 100 by inserting the second end 130 through the opening 116 provided in the second lever member 114. In this manner, the second biasing member 126 provides a biasing force of pulling the raise/lower member 100 in the upward direction.

Because the raise/lower member 100 is capable of rotating, the leg portions 102, 104, 106 of the raise/lower member 100 are capable of being moved in the upward (i.e., raised) and downward (i.e., lowered) directions in the following manner. In particular, the second handle member 72 is capable of being moved inward toward the vehicle 10 and outward away from the vehicle 10. To move the raise/lower member 100 to an upper position, as shown in FIG. 2 (see also FIGS. 9-11), the portion 74 of the second handle member 72 is moved inward and, because the second handle member 72 is capable of rotating, in particular, relative to the vehicle 10, the portion 78 of the second handle member 72 moves in the upward direction. Because the portion 78 is attached with the link member 88, 90 (such as through the downwardly extending portion 79 and use of the opening 84), any upward movement of the portion 78 in turn moves the link member 88, 90 in the upward direction. And in turn, because the link member 88, 90 is attached with the lever member 110 of the raise/lower member 100, any upward movement of the link member 88, 90 rotates the raise/lower member 100 in a clockwise direction (if viewing from the right back end of the vehicle 10). This in turn causes the leg portions 102, 104, 106 of the raise/lower member 100 to be moved in the upward direction away the ground.

In the alternative, to move the raise/lower member 100 to a lower position, as shown in FIGS. 3 and 4 (see also FIGS. 7 and 8), the portion 74 of the second handle member 72 is moved outward and, because the second handle member 72 is capable of rotating, in particular, relative to the vehicle 10, the portion 78 of the second handle member 72 moves in the downward direction. Because the portion 78 is attached with the link member 88, 90, any downward movement of the portion 78 in turn moves the link member 88, 90 in the downward direction. And in turn, because the link member 88, 90 is attached with the lever member 110 of the raise/lower member 100, any downward movement of the link member 88, 90 rotates the raise/lower member 100 in a counterclockwise direction (if viewing from the right back end of the vehicle 10). This in turn causes the leg portions 102, 104, 106 of the raise/lower member 100 to be moved in the downward direction toward the ground.

The above disclosed embodiment of the lifting system 70 can be readily operated by a single operator, while the operator is positioned in a vehicle 10 to which the lifting system 70 is attached. By moving the second handle member 72 to lower the raise/lower member 100, the operator can move the raise/lower member 100 proximal to the ground or pavement. The operator can then operate the vehicle 10 to move the raise/lower member 100 into engagement with the dolly tongue 142 so that the raise/lower member 100 supports the dolly tongue 142. The operator can then operate the lifting system 70 to raise the tongue 142 and place it into alignment with the hitch mechanism 20.

Referring to FIGS. 7-11, a method of hitching the dolly 140 to the vehicle 10 using the combination of the lifting system 70 and the hitch mechanism 20 of the present invention will now be discussed. As shown in these FIGS., the dolly 140 includes the tongue 142 that includes an opening 144 through which the coupling member 62 of the hitch mechanism 20 may be inserted. The dolly 140 may remain stationary throughout the hitching process.

Figure 7:
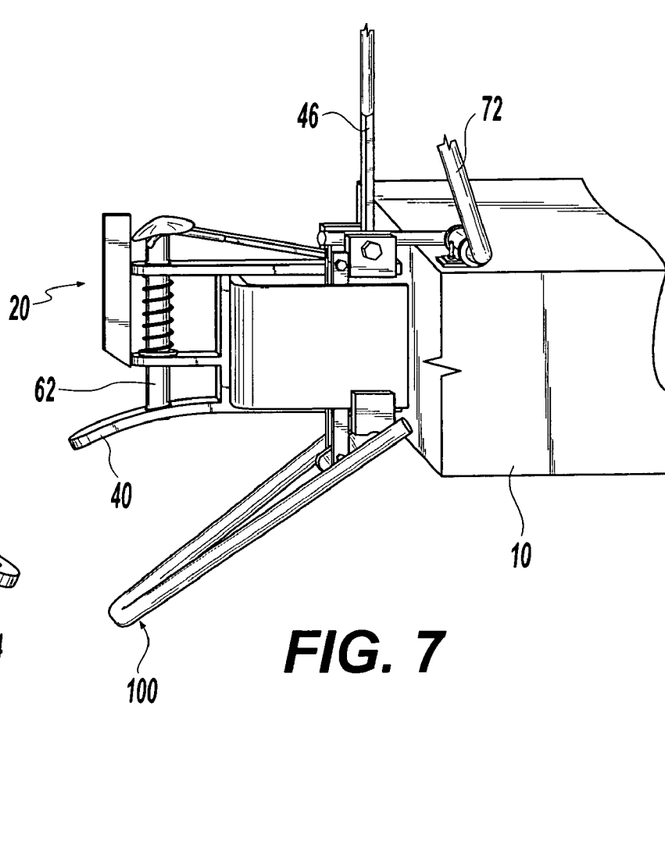
FIG. 7 is a perspective view of the vehicle and dolly, illustrating the raise/lower member in a lower position.

As shown in FIG. 7, an operator (not shown) of the vehicle 10 is beginning to move or drive the vehicle 10 towards the dolly 140. As also shown, the second handle member 72 is pushed outward toward the vehicle 10 so that the raise/lower member 100 is in a lower position, proximal to the ground or pavement.

Figure 8:
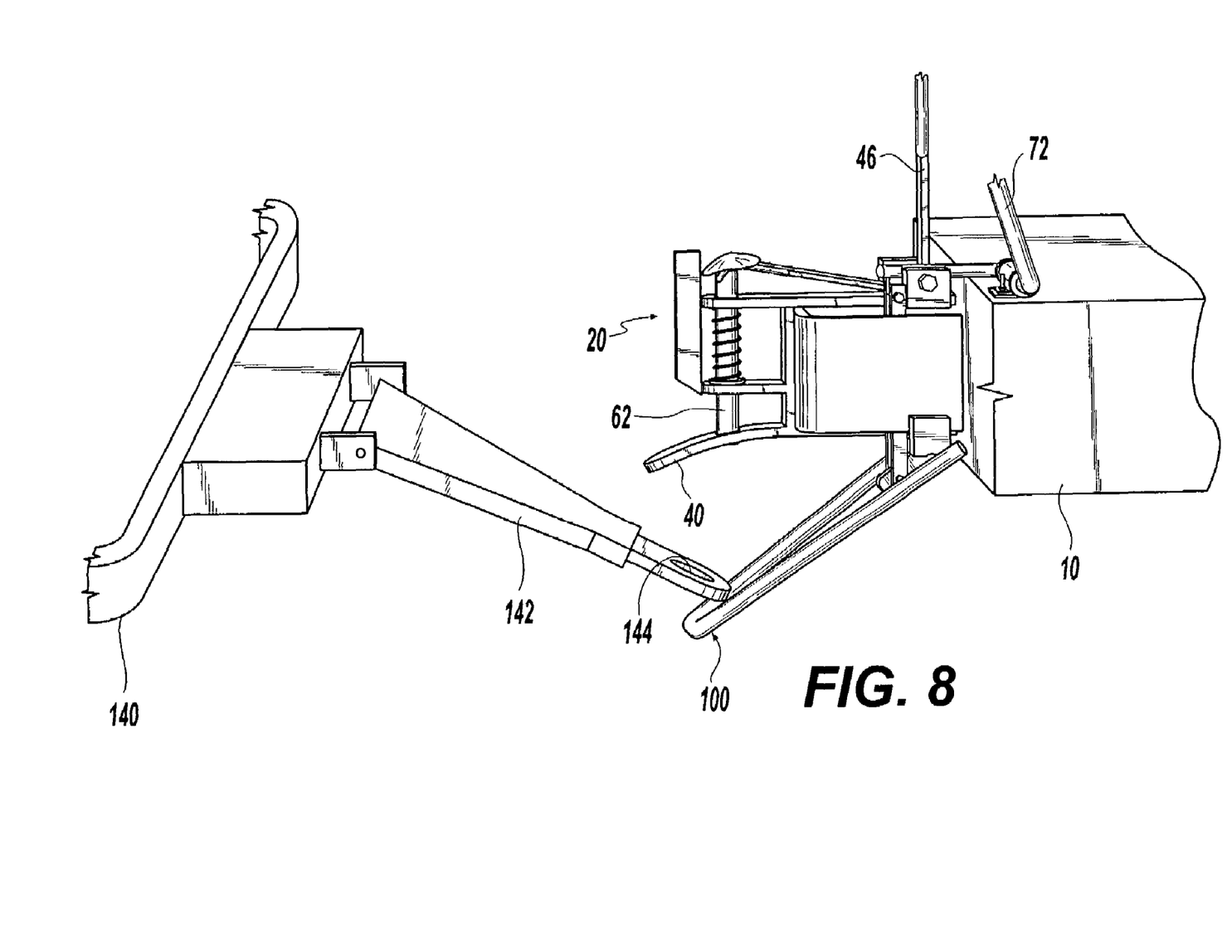
FIG. 8 is a perspective view of the vehicle and dolly, illustrating the raise/lower member engaging a tongue of the dolly in order to raise the dolly tongue.

As shown in FIG. 8, the operator of the vehicle 10 continues to drive the vehicle 10 towards the dolly 140 until the raise/lower member 100 engages at least a portion of the dolly tongue 142. As shown, the raise/lower member 100 is positioned underneath at least a portion of the dolly tongue 142.

Figure 9:
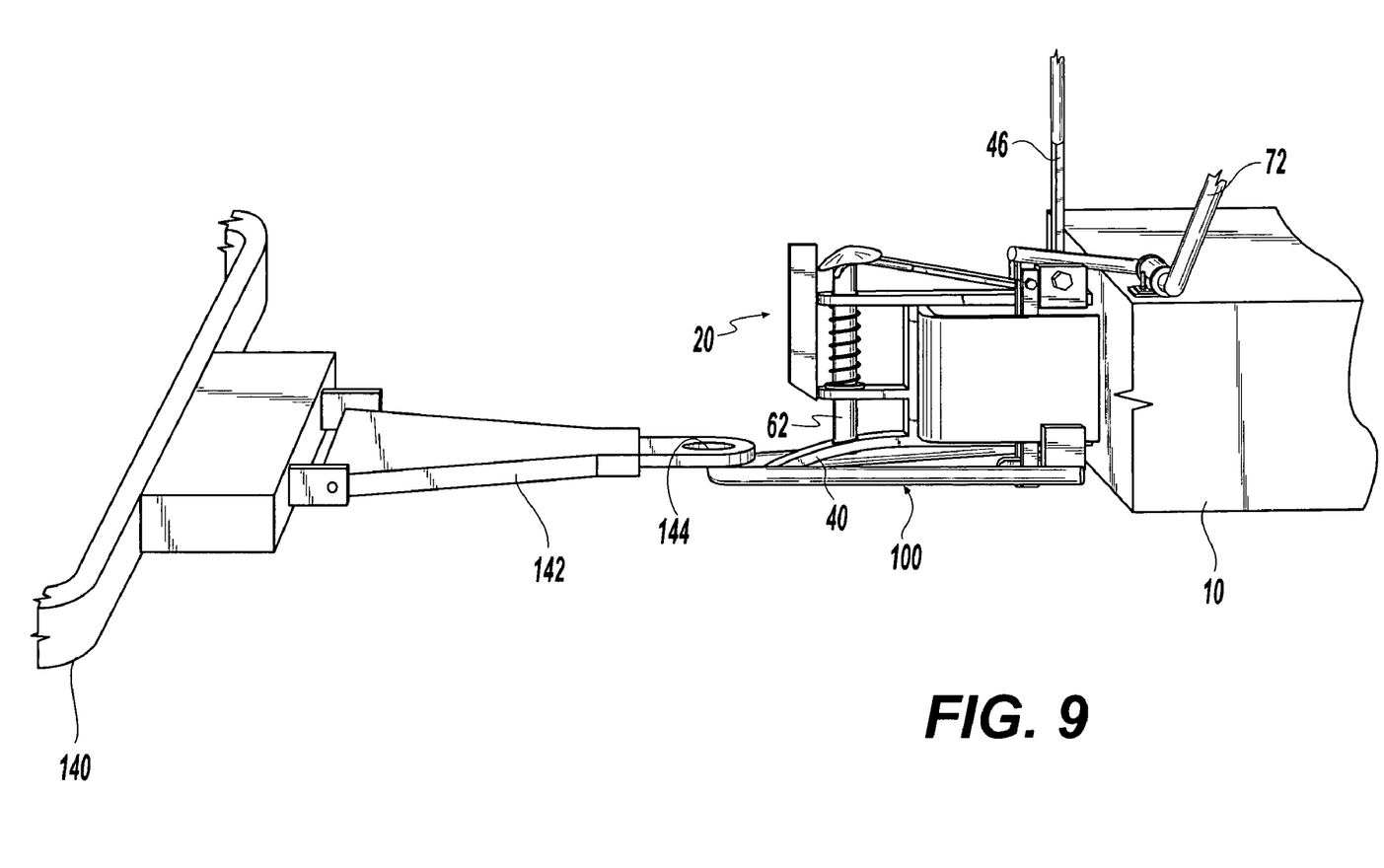
FIG. 9 is a perspective view of the vehicle and dolly, illustrating the raise/lower member in an upper position supporting the dolly tongue and having thereby raised the dolly tongue to an upper position.

Then, as shown in FIG. 9, the operator of the vehicle 10 pulls inward on the second handle member 72 so that the raise/lower member 100 is raised to its upper position. Because the raise/lower member 100 is positioned underneath and supports the dolly tongue 142, the upward movement of the raise/lower member 100 also raises the dolly tongue 142 to an upper position. This upper position is above the lower position, but below the uppermost position of the raise/lower member 100 that is shown in FIG. 2.

Figure 10:
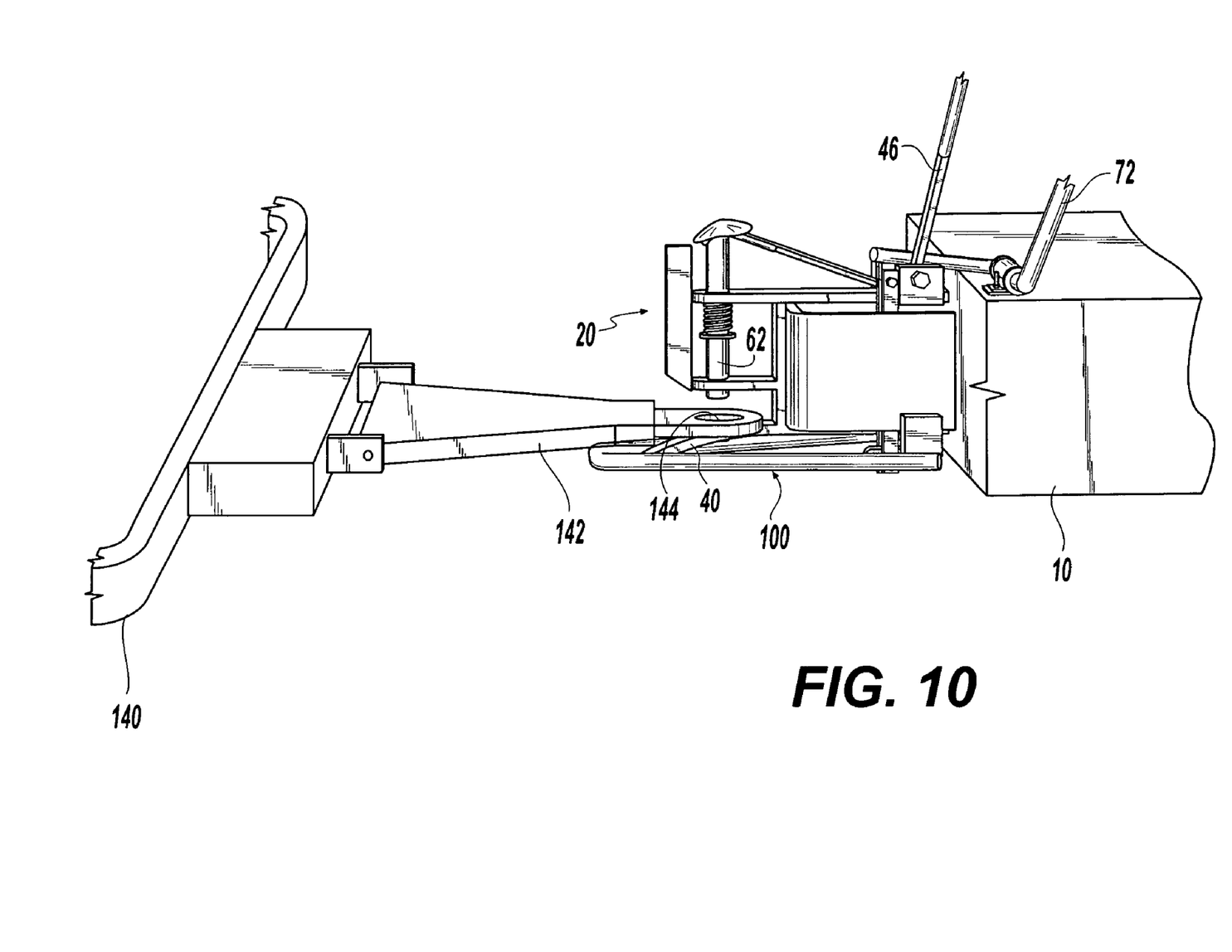
FIG. 10 is a perspective view of the vehicle and dolly, illustrating a hitch pin of the hitch mechanism that is raised in order to be inserted into an opening provided in the dolly tongue.

Next, as shown in FIG. 10, the operator of the vehicle 10 again drives the vehicle 10 towards the dolly 140 until the dolly tongue 142 is positioned on top of the hitch 40. In other words, the raise/lower member 100 has been repositioned so that the coupling member 62 of the hitch mechanism 20 is proximal to and thus capable of engaging the opening 144 of the dolly tongue 142. As also shown in this FIG., the coupling member 62 has been raised by moving the first handle member 46.

Figure 11:
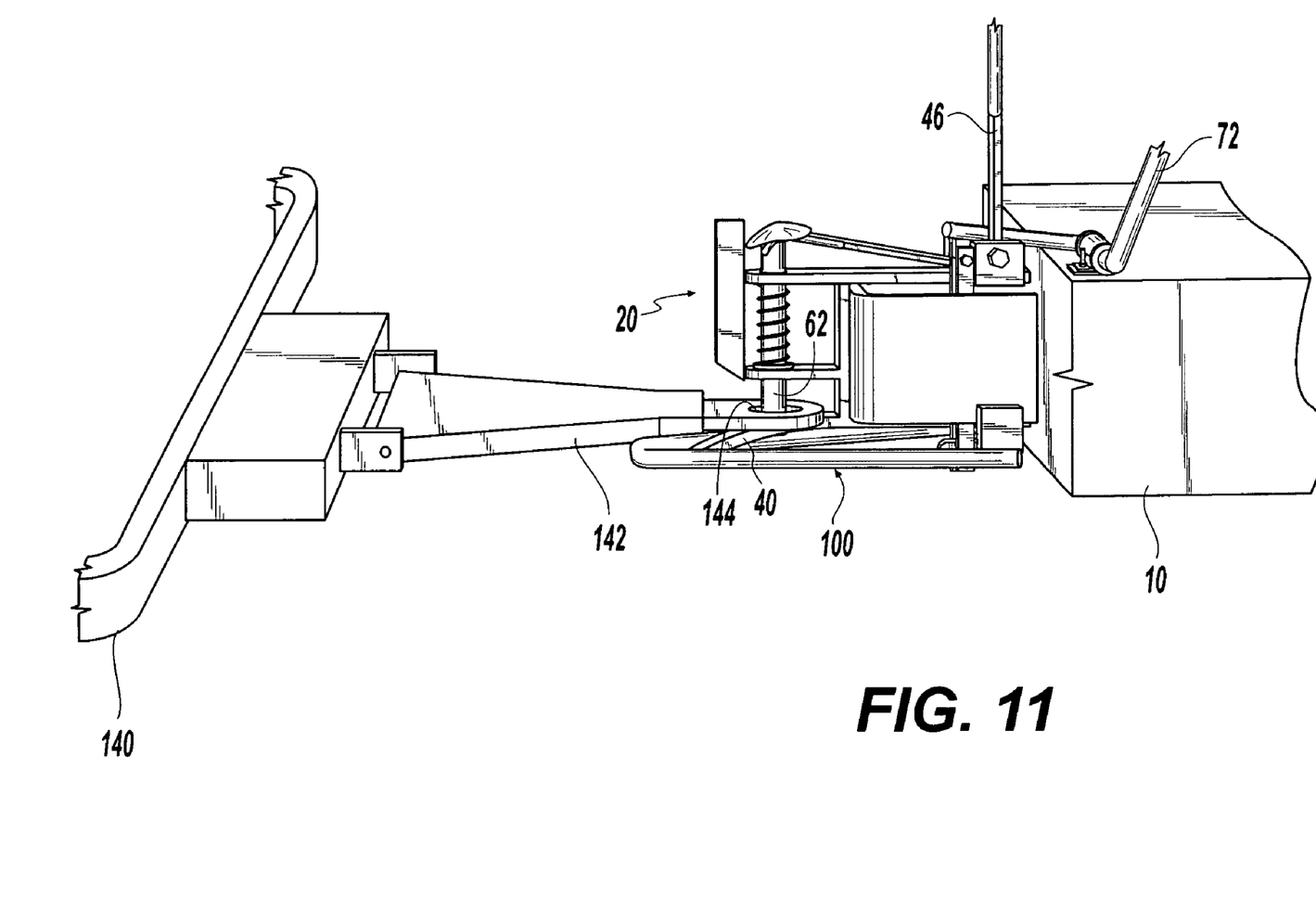
FIG. 11 is a perspective view of the vehicle and the dolly, illustrating the hitch pin of the hitch mechanism inserted into the opening provided in the dolly tongue.

Last, as shown in FIG. 11, once the coupling member 62 aligns with the opening 144 of the dolly tongue 142, the coupling member 62 is lowered so that it is inserted into the opening 144 by moving the first handle member 46. In this manner, the dolly 140 is hitched to the vehicle 10, and the vehicle 10 may haul the dolly 140 to another location.

Once the vehicle 10 hauls the dolly 140 to another location, the dolly 140 may be un-hitched from the vehicle 10. This un-hitching generally may comprise a reverse of the movements used to hitch the dolly 140 to the vehicle 10. In particular, first, the coupling member 62 is raised so that it exits from the opening 144 of the dolly tongue 142 by moving the first handle member 46. The operator of the vehicle 10 then drives the vehicle 10 away from the dolly 140 until the dolly tongue 142 is no longer positioned on top of the hitch 40 but is still on top of the raise/lower member 100. The operator can then further drive the vehicle 10 away from the dolly 140, and the tongue 142 will lower proximal to the ground or pavement, or onto the ground or pavement itself, due to gravity.

If the operator of the vehicle 10 does not want the tongue 142 to be lowered proximal to the ground or onto the ground due to gravity, the operator can push outward on the second handle member 72 so that the raise/lower member 100 is lowered to its lower position. Because the raise/lower member 100 is positioned underneath and supports the dolly tongue 142, the downward movement of the raise/lower member 100 also lowers the dolly tongue 142 to a lower position. The operator of the vehicle 10 then drives the vehicle 10 in a direction away from the dolly 140 until the raise/lower member 100 is no longer positioned underneath the dolly tongue 142. The operator then pulls inward on the second handle member 72 toward the vehicle 10 so that the raise/lower member 100 is raised to the upper position.

In one embodiment, as shown in FIG. 2, in its uppermost position, the raise/lower member 100 rests against the second vertical bar 44 of the mounting mechanism 22 so that it does not extend past the hitch 40 and, thus, is not a tripping hazard for anyone walking behind the vehicle 10.

Accordingly, the present invention includes a lifting mechanism 70 that includes a member 100 that can be moved to engage a structure, such as a dolly tongue 142, to support the structure. The lifting system 70 further includes an intermediate mechanism 86 that is capable of raising and lowering the raise/lower member 100. The lifting system 70 further includes a control 72 to cause the mechanism 86 to raise and lower the raise/lower member 100. Once the raise/lower member 100 is moved to support the structure, the control 72 causes the intermediate mechanism 86 to raise and lower the raise/lower member 100, thereby also raising and lowering the structure. In one embodiment, the control 72 causes the intermediate mechanism 86 to raise the raise/lower member 100 and the structure so that the structure is in a position to be coupled with, for example, a hitch mechanism 20.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A lifting system for use with a hitch mechanism, comprising:
    a raise/lower member;
    an intermediate mechanism, attached to the raise/lower member at a first end and attached to a control at a second end, to move the raise/lower member between a lower position and an upper position; said control causing the intermediate mechanism to move the raise/lower member from one position to the other; and
    a biasing member having a spring,
    wherein the raise/lower member includes a plurality of leg portions, a horizontal member that has a first end attached with a first leg portion and a second end attached with a second leg portion, and a lever member attached with the horizontal member, wherein the lever member is provided with an opening; and
    wherein an end of the spring is inserted through the opening of the lever member to attach the spring with the raise/lower member.

2. The lifting system of claim 1, wherein the raise/lower member engages and supports a structure coupled with the hitch mechanism.

3. The lifting system of claim 2, wherein the raise/lower member includes at least a portion configured under the structure coupled with the hitch mechanism to support the structure.

4. The lifting system of claim 1, wherein the raise/lower member is attached with the hitch mechanism.

5. The lifting system of claim 1, wherein the raise/lower member is attached with the intermediate mechanism.

6. The lifting system of claim 1,
    wherein the intermediate mechanism includes a second attachment mechanism, wherein each of the pair of linkage bars is provided with a second opening proximal to a lower end thereof, and wherein the second attachment mechanism includes at least a second bolt and a second nut; and
    wherein the link member is attached with the raise/lower member by inserting the second bolt through the second opening of each of the pair of linkage bars and the opening of the first lever member, and then securing the second bolt with the second nut.

7. The lifting system of claim 6, wherein movement of the handle member moves the intermediate mechanism to move the raise/lower member.

8. The lifting system of claim 7, wherein the hitch mechanism couples a structure to a vehicle, wherein movement of the handle member in a direction outward from the vehicle moves the intermediate mechanism in a downward direction to lower the raise/lower member.

9. The lifting system of claim 8, wherein the hitch mechanism couples a structure to a vehicle, wherein movement of the handle member in a direction inward toward the vehicle moves the intermediate mechanism in an upward direction to raise the raise/lower member.

10. The lifting system of claim 1, wherein the spring is attached with the raise/lower member to provide a biasing force of pulling the raise/lower member in an upward direction.

11. The hitch mechanism of claim 10, wherein said control further includes a handle member, said handle member comprising an opening and being attached to the intermediate mechanism;
    wherein the intermediate mechanism includes at least a link member and a first attachment mechanism, said link member includes a pair of linkage bars, each of the pair of linkage bars being provided with a first opening proximal to an upper end thereof, and wherein the first attachment mechanism includes at least a first bolt and a first nut; and
    wherein the link member is attached with the handle member by inserting the first bolt through the first opening of each of the pair of linkage bars and the opening of the handle member, and then securing the first bolt with the first nut.

12. The hitch mechanism of claim 1, wherein said control further includes a handle member, said handle member comprising an opening and being attached to the intermediate mechanism;
    wherein the intermediate mechanism includes at least a link member and a first attachment mechanism, said link member includes a pair of linkage bars, each of the pair of linkage bars being provided with a first opening proximal to an upper end thereof, and wherein the first attachment mechanism includes at least a first bolt and a first nut; and
    wherein the link member is attached with the handle member by inserting the first bolt through the first opening of each of the pair of linkage bars and the opening of the handle member, and then securing the first bolt with the first nut.

13. The lifting system of claim 12, wherein the raise/lower member engages and supports a structure coupled with the hitch mechanism.

14. The lifting system of claim 13, wherein the raise/lower member includes at least a portion configured under the structure coupled with the hitch mechanism to support the structure.

15. The lifting system of claim 12, wherein the raise/lower member is attached with the hitch mechanism.

16. The lifting system of claim 12, wherein the raise/lower member is attached with the intermediate mechanism.

17. A hitch mechanism including a lifting system, said hitch mechanism comprising:
    a first handle member;
    a coupling member;
    a first linkage mechanism for linking the first handle member and the coupling member, wherein the first handle member is capable of being moved in order to raise and lower the coupling member; and
    a biasing member comprising a spring having a first end and a second end; and
    wherein the lifting system comprises:
    a second handle member;
    a raise/lower member; and a second linkage mechanism attached to the raise/lower member at a first end and attached to the second handle member at a second end, said second linkage mechanism being configured to link the second handle member and the raise/lower member, wherein the second handle member is capable of being moved in order to raise and lower the raise/lower member;

wherein the raise/lower member includes a plurality of leg portions, a horizontal member that has a first end attached with a first leg portion and a second end attached with a second leg portion, and a lever member attached with the horizontal member, wherein the lever member is provided with an opening; and wherein the second end of the spring is inserted through the opening of the lever member to attach the spring with the raise/lower member.

18. The hitch mechanism of claim 17, wherein the second end of the spring is attached with the raise/lower member to provide a biasing force of pulling the raise/lower member in an upward direction.

* * * * *